United States Patent

Hirohata et al.

[11] Patent Number: 6,090,326
[45] Date of Patent: *Jul. 18, 2000

[54] TUBULAR OBJECT MANUFACTURING METHOD

[75] Inventors: Toshiro Hirohata; Akira Nishimura; Masahiro Habuka; Chiaki Kato, all of Osaka, Japan

[73] Assignee: Sumitomo Electric Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,347

[22] Filed: Sep. 26, 1996

[30] Foreign Application Priority Data

Sep. 26, 1995 [JP] Japan .................................. 7-271701

[51] Int. Cl.[7] .............................. B29C 41/02; B29C 41/04
[52] U.S. Cl. .............................................................. 264/310
[58] Field of Search .................................... 264/312, 310, 264/209.2; 475/435

[56] References Cited

U.S. PATENT DOCUMENTS

| | | | |
|---|---|---|---|
| 3,084,088 | 4/1963 | Hunkeler | 264/310 |
| 4,011,354 | 3/1977 | Drostholm et al. | 427/195 |
| 4,051,284 | 9/1977 | Ohkubo et al. | 264/313 |
| 5,188,693 | 2/1993 | Nagata et al. | 264/263 |
| 5,433,913 | 7/1995 | Kawauchi et al. | 264/306 |
| 5,609,811 | 3/1997 | Jermo | 264/310 |

FOREIGN PATENT DOCUMENTS

| | | |
|---|---|---|
| 0 283 604 | 9/1988 | European Pat. Off. . |
| 0 613 729 | 9/1994 | European Pat. Off. . |
| 2 291 840 | 6/1976 | France . |
| 62-19437 | 1/1987 | Japan . |
| 7-164456 | 6/1995 | Japan . |

OTHER PUBLICATIONS

Patent Abstracts of Japan, vol. 015, No. 081 (m–1086), Feb. 25, 1991 & JP 02 301409 A (Nitto Denko Corp), Dec. 13, 1990, *abstract*.

*Primary Examiner*—Jan H. Silbaugh
*Assistant Examiner*—Edmund H. Lee
*Attorney, Agent, or Firm*—Sughrue, Mion, Zinn, Macpeak & Seas, PLLC

[57] ABSTRACT

A tubular object manufacturing method comprising the steps of applying liquid heat-resistant resin containing an inorganic filler as desired onto an outer surface or inner surface of a core member which is a shaping mold to thereby form a coating layer, solidifying or hardening the applied liquid heat-resistant resin until the coating layer becomes strong enough to maintain at least a structure of the tubular object, and taking the tubular object out from the core member. In the method, liquid heat-resistant resin with a viscosity of 10 to 15000 poise at 25° C. is continuously fed by means of a dispenser onto the outer surface or inner surface of the core member while rotating the core member, and a feeder part of the dispenser is moved in the direction of a rotation axis of the core member so that the fed liquid heat-resistant resin is helically wound to thereby form the coating layer. Tubular objects obtained by the manufacturing method is excellent in thickness precision, less in resin loss, and capable of being given desired thickness distribution in the axial direction as necessary.

2 Claims, 1 Drawing Sheet

TUBULAR OBJECT MANUFACTURING METHOD

BACKGROUND OF THE INVENTION

1. Field of the Invention

The present invention relates to a tubular object manufacturing method, and more particularly to a tubular object manufacturing method in which liquid heat-resistant resin is applied onto the surface of a core member such as a columnar mold, cylindrical mold, or the like, and this applied liquid heat-resistant resin is solidified or hardened. Moreover, the present invention relates to tubular objects obtained in such a manner.

2. Description of the Related Art

Heat-resistant films are used in various applications such as flexible print substrates, insulators for electrical equipment, magnetic tapes, and the like. Among these heat-resistant films, tubularly molded heat-resistant films are used for fixing belts, etc. in electronic photocopiers, facsimile machines, printers, etc. That is, with respect to electronic photocopiers etc., there is a method for thermally fusing the toner on the recording paper and fixing the toner image on the recording paper, in which the toner is directly heated on the recording paper by a heater via a film-like endless fixing belt (tubular object). With respect to this fixing belt, because superior heat resistance, strength, Young's modulus of elasticity, etc. are required, a polyimide film with superior heat resistance and mechanical strength is generally used.

As the manufacturing method for tubular objects including polyimide films, a method has been proposed (Unexamined Japanese Patent Publication (kokai) Nos. Hei-7-164456 and Sho-62-19437) in which a polyimide precursor solution is applied by the dipping method onto the outer circumferential surface of a core member such as a columnar mold or to the inner circumferential surface of a cylindrical mold; next, the excess resin is shaved off by dead-weight dropping of a die-shaped object (in the case of coating onto the outer circumferential surface) or a bullet-shaped object (in the case of coating onto the inner circumferential surface) from the upper end of the application area; after obtaining the predetermined film thickness, the coating layer is heated to form a hardened coating of polyimide.

In the conventional tubular object manufacturing method, improvements have been desired particularly in the following two points. The first point is that, because the viscosity of the not-yet-hardened heat-resistant resin is reduced by heating after formation of the coating layer, there have occurred cases where sagging occurs in the coating layer, depending on the viscosity of the heat-resistant resin or the heating condition, to thereby generate irregularity in thickness of the coating layer. The second point is that several centimeters at the upper end of the coating layer cannot be used for the product because the upper end of the coating layer may become slanted at the time of dipping, or because when starting the dropping of the die-shaped or bullet-shaped object, the circumferential position of these dropping objects is unstable. Furthermore, in order to facilitate removal of the mold, it is necessary to remove approximately 1 cm of resin at the lower end part of the mold after application has been conducted to the lower end by dipping. That is, there are portions which cannot be used at the opposite ends, resulting in resin loss. In addition, with the conventional tubular object manufacturing method, it has been impossible to manufacture, for example, crown-shaped or drum-shaped tubular objects which have thicknesses varying in the axial direction, or tubular objects which have circumferential strength larger than axial strength.

The aforementioned tubular object manufacturing method is not only applicable to polyimide, but also to any other liquid heat-resistant resins, for example, unhardened liquid thermosetting resin, solutions of unhardened thermosetting resin, or solutions of thermoplastic resin. However, the cases where tubular objects are manufactured using the other liquid heat-resistant resins, the same problems of thickness irregularity and resin loss occur as in the case of using polyimide. And there is the same problem that it is impossible to manufacture tubular objects having thicknesses varying in the axial direction or tubular objects with circumferential strength larger than axial strength.

SUMMARY OF THE INVENTION

It is an object of the present invention to provide a tubular object manufacturing method which is excellent in thickness precision, small in resin loss, and capable of making the tubular object having the desired thickness distribution in the axial direction, as necessary, and to provide such a tubular object.

The present invention obtains tubular objects excellent in thickness precision and small in resin lose when a coating layer is formed by helically winding the supplied liquid heat-resistant resin by moving the feeder part of the dispenser in the direction of the rotation axis of the core member while feeding liquid heat-resistant resin from the dispenser onto an outer surface or inner surface of a core member which rotates in the circumferential direction.

According to this method, tubular objects with thickness varying in the axial direction can be obtained by adjusting the amount of the liquid heat-resistant resin supplied from the dispenser, the moving speed of the dispenser feeder part in the direction of the rotation axis, and the like. Furthermore, according to this method, it is possible to obtain tubular objects with circumferential strength larger than axial strength by using liquid heat-resistant resin containing needle-shaped or scaly inorganic filler.

A tubular object manufacturing method comprises the steps of: applying liquid heat-resistant resin onto an outer surface or inner surface of a core member which is a shaping mold to form a coating layer, the applying step including the steps of: rotating the core member, continuously feeding liquid heat-resistant resin with a viscosity of 10 to 15000 poise at 25° C. by means of a dispenser onto an outer surface or inner surface of the core member, moving a feeder part of the dispenser in a direction of a rotation axis of the core member, and forming the coating layer by helically winding the fed liquid heat-resistant resin; solidifying or hardening the applied liquid heat-resistant resin until the coating layer becomes strong enough to maintain at least a structure of the tubular object; and taking the tubular object out from the core member.

Thus the tubular objects are obtained by the above manufacturing method.

Furthermore, according to the present invention, the tubular object comprises liquid heat-resistant resin containing a needle-shaped or scaly inorganic filler, and the tubular object has circumferential strength which is larger than axial strength.

Accordingly, the present invention can markedly improve the thickness precision of the tubular object, and reduce resin loss, and also permits a desired thickness distribution in the axial direction of the tubular object according to necessity. Furthermore, by using a liquid heat-resistant resin containing needle-shaped or scaly inorganic filler, tubular objects which have circumferential strength larger than axial strength can be manufactured.

DETAILED DESCRIPTION OF THE PREFERRED EMBODIMENTS

A detailed description of the present invention follows with reference to the accompanying drawings.

In the manufacturing method of the present invention, liquid heat-resistant resin with a viscosity of 10 to 15000 ps is helically wound and applied onto an outer surface or inner surface a columnar of cylindrical tubular member or core member which rotates in the circumferential direction, while the liquid heat-resistant resin is continuously fed from a dispenser and the feeder part of the dispenser is moved in the direction of the rotational axis of the core member.

Figure 1:
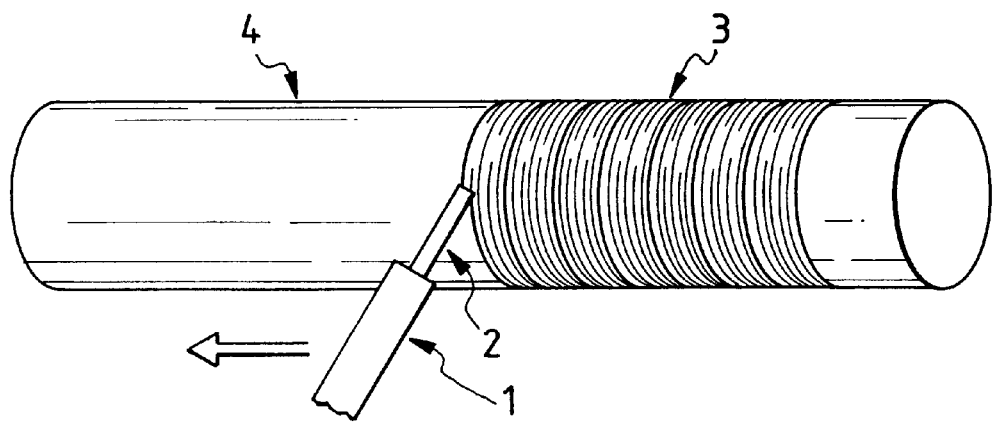
FIG. 1 is an explanatory view of the application method using the dispenser of the present invention.
Figure 2:
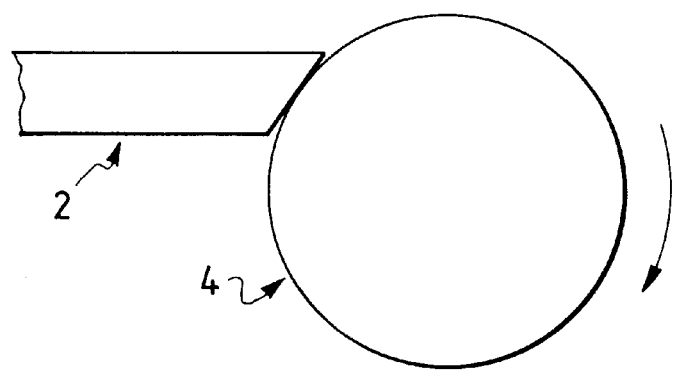
FIG. 2 is an explanatory view of the shape of the nozzle tip and the contact position between the nozzle and core member in the application method of the present invention.

As shown in FIG. 1, when the liquid heat-resistant resin is continuously fed from the feeder part 2 of the dispenser 1 and the feeder part 2 is moved in the direction of the rotational axis of the core member, while rotating a columnar core member 4 in the circumferential direction, the supplied liquid heat-resistant resin 3 is helically wound to form the coating layer. With respect to the helically wound liquid heat-resistant resin, its adjacent parts join to each other form a uniform coating layer. The feeder part of the dispenser is generally formed to be a nozzle. As shown in FIG. 2, it is preferable to form the tip of the nozzle 2 slantingly, to set the nozzle position so that the central part of the tip (the liquid discharge port) moves in the direction of the rotational axis of the core member while it contacts the outer surface of the core member 4. The inner diameter of the nozzle (the liquid discharge port) is generally in a range of about 0.5 to 5 mm, preferably in a range of about 1 to 3 mm.

The moving speed of the dispenser and the rotational speed of the core member are adjusted, and the liquid heat-resistant resin is applied without gaps onto the outer or inner surface of the core member so that parts of the helically applied liquid heat-resistant resin contact with each other to form a uniform coating layer. After this application step, the applied liquid heat-resistant resin is solidified or hardened by the usual methods until the coating layer becomes strong enough to maintain a structure at least as a tubular object. Then, the tubular object can be obtained by taking it out from the core member.

The viscosity at 25° C. of the liquid heat-resistant resin have to be 10 to 15000 poise (ps). If this viscosity exceeds 15000 ps, the parts of the helically applied liquid heat-resistant resin which come into contact with each other so as to be connected will be thinner than the other parts, and irregularities will occur on the surface of the heat-resistant resin layer (coating layer). If the viscosity of the liquid heat-resistant resin is less than 10 ps, liquid sagging or cissing occurs at the time of application or at the time of drying, and it becomes difficult to form the tubular object. By setting the viscosity of the liquid heat-resistant resin in a range of from 10 to 15000 ps, there is no liquid sagging or cissing, and the surface of the liquid is made smooth by movement of the liquid due to gravitational force or centrifugal force after application, and an even heat-resistant resin layer can be formed. In order to surely prevent liquid sagging, cissing, and the formation of irregularities, it is preferable to set the viscosity of the liquid heat-resistant resin which is used in a range of from 100 to 3000 ps.

The liquid heat-resistant resin used in the present invention refers to such resin that, in the case where tubular objects are formed, the tubular objects are capable of continuous use at 100° C. or above, and that the resin is capable of molding in a liquid state. That is, it refers to a solution in which unhardened liquid thermosetting resin or unhardened thermosetting resin is dissolved in a solvent, or a solution in which thermoplastic resin is dissolved in a solvent. Moreover, the liquid heat-resistant resin used in the present invention also includes the addition of inorganic filler to the aforementioned resins.

Specific examples of heat-resistant resins may include polyimide, polyamide imide, polybenzo-imidazole, polybenzo-oxazole, polyphenylene sulfide, polysulfone, polyether etherketone, polyether sulfone, polyether imide, polyarylate, liquid crystal polymers, epoxy resin, and the like. Among these heat-resistant resins, the manufacturing method of the present invention can be particularly preferably applied to polyimide. Polyimide is generally used as a solution (polyimide varnish) in which the polyimide precursor is dissolved in a solvent, and after applying it to the surface of the mold, the solvent is thermally removed and polyimide solution is thermally hardened (imidified) so as to produce a firm thin film. Namely, the polyimide varnish is a solution in which polyimide or polyimide precursor is dissolved in a solvent.

Examples of the inorganic filler contained in the liquid heat-resistant resin, may include, for example, boron nitride, alumina, silicon carbide, potassium titanate, aluminum nitride, mica, silica, titanium oxide, talc, calcium carbonate, etc.

There are no particular restrictions on the shape of the core member used in the present invention, but columnar or cylindrical shapes can be used preferably. Examples of the material for the core member used in the present invention may include metals such as aluminum, aluminum alloy, iron, and stainless steel; ceramics such as alumina and silicon carbide; heat-resistant resins such as polyimide, polyamide imide, polybenzo-imidazole, and polybenzo-oxyazole.

In order to ameliorate the mold releasability of the core member, it is preferable to apply a mold lubricant consisting of silicone oil or the like, or to apply a ceramic coating to the core member. Examples of the ceramics may is include silica, alumina, zirconia or silicon nitride coated with ceramics by the sol-gel method; alumina or zirconia coated with ceramics by the spraying method; or aluminum nitride coated with ceramics by the spattering method. Among these ceramic coatings, ceramic coating by the sol-gel method is preferable, because it does not require any expensive equipment and it is easy in coating operations.

With the manufacturing method of the present invention, desired thickness distribution in the axial direction of the tubular object can be obtained by desirably changing the amount of liquid heat-resistant resin supplied from the dispenser and the moving speed of the dispenser feeder part while the dispenser feeder part is moving in the direction of the rotation axis. For example, crown-shaped tubular objects which are thin at the central part in the axial direction but thick at opposite ends can be easily manufactured.

In the tubular objects to be used as fixing belts, inorganic fillers such as alumina, silicon carbide, boron nitride, and silica may be added in order to improve thermal conductivity. According to the type of inorganic filler, there are cases where its compatibility with the liquid heat-resistant resin is insufficient, and when such a liquid heat-resistant resin is applied by the application method of the present invention, there may occur areas of slightly darker color along the helical application path resulting in a striped pattern, and in extreme cases, the thickness may vary between the dark colored areas and the lighter areas resulting in unevenness. This is considered to be caused by the lack of uniformity in the dispersion of the inorganic filler. The occurrence of this striped pattern can be prevented by the following method. That is, the occurrence of the striped pattern and unevenness by a liquid stirring effect in the vicinity of the liquid discharge port, or the like, can be prevented by keeping the liquid discharge port of the dispenser feeder part in contact with the heat-resistant resin layer applied to the core member and by conducting application under conditions that the moving speed V (mm/sec) and the rotational speed R (rotations/sec) of the tubular core member are within the range represented by relational expression (1).

$$0<(V/R)<1.5 \text{ (mm/rotation)} \quad (1)$$

In the case where V/R is 1.5 sm/rotation or more, it happens that the stirring effect in the vicinity of the liquid discharge port is insufficient and that the striped pattern and unevenness occur. Further, it is preferable that the range of (V/R) is in the range of 0.15 to 1.5.

With respect to the reduction in cost, it is preferable to have a short application time. In the case where application is conducted in accordance with the relational expression (1), the application time can be shortened by raising the rotational speed of the core member, but there are upper limits to the rotational speed because it is necessary to prevent the scattering of the liquid by centrifugal force.

In such a case, by making the liquid discharge port into a specific shape, it is possible to prevent the occurrence of striped patterns and unevenness while reducing the application time. That is, the liquid discharge port of the dispenser feeder part is made tubular, and its wall thickness t (mm) is set within the following range.

$$0.3 \text{ mm}<t<3.0 \text{ mm} \quad (2)$$

The aforementioned stirring effect in the vicinity of the liquid discharge port is thought to occur because the wall end face of the tubular discharge port contacts the resin on the core member. It has been experimentally confirmed that an adequate stirring effect is obtained when the width of the wall end face in this occasion is within the aforementioned range, but an adequate stirring effect is not obtained when the wall thickness t of the tubular liquid discharge port is less than 0.3 mm or more than 3.0 mm. With respect to the wall thickness t of the tubular liquid discharge port, a range of 0.5 to 2.0 mm is more preferable.

With respect to the liquid discharge port of the dispenser feeder part, a plastic tube, a rubber tube, a metallic tube, or the like, may be used preferably. Among these, tubes of polytetra-fluoroethylene (PTFE) or tetrafluoro-ethylene/perfluoro-alkylvinylether copolymer (PFA) may be used particularly preferably, because they possess a high degree of rigidity and are less likely to inflict scratches on the core member.

When tubular objects are manufactured according to the manufacturing method of the present invention, by using liquid heat-resistant resin containing inorganic filler which is needle-shaped or which is scaly with different vertical and horizontal lengths in the plate faces, it is possible to manufacture tubular objects which have circumferential strength larger than axial strength, because the inorganic filler is oriented in the circumferential direction. When such a tubular object is used, for example, as a fixing belt, it is useful because it is strong against circumferential tension and circumferential fatigue. Example of the needle-shaped filler may include titanate whisker, silicon carbide whisker, etc., although the invention is not limited thereto. Examples of the scaly filler may include boron nitride, mica, etc., although the invention is not limited thereto.

The present invention is explained more specifically by means of the following examples and comparative examples.

EXAMPLE 1

As the mold, an aluminum column with an outer diameter of 20 mm$\phi$ and with a ceramic coating on its surface were used. While rotating this columnar mold, the nozzle which was set in the resin feeder part of the dispenser was made to contact with the surface of the core member. As the liquid heat-resistant resin, 10 parts alumina powder (AL-45H) manufactured by Showa Denko K.K. added to 100 parts polyimide varnish manufactured by Ube Industries, Ltd. and uniformly mixed, was used. While feeding resin in a fixed quantity from the nozzle in this state, the nozzle was moved at a fixed speed in the direction of the rotation axis of the core member, and the resin application was conducted. The application conditions at this time were as shown in Table 1. The viscosity of the resin in Table 1 was measured by a B-type viscometer at a liquid temperature of 25° C. and a rotor rotational speed of 6 rpm.

As the nozzle of the dispenser, a PTFE tube with an inner diameter of 2 mm and an outer diameter of 4 mm was used. As shown in FIG. 2, the tip of the tube 2 is cut off at 45°, and the nozzle position is set so that the central part of the cut-off face moves in the axial direction of the core member while contacting the outer surface of the core member 4.

The nozzle was put in contact at a position 20 mm from the right end of the mold and the feeding of the resin was started; the feeding of the resin was stopped at the point of time when the nozzle reached a position 20 mm from the left end of the mold, and the nozzle was separated from the core member. Subsequently, heating was conducted in stages up to 400° C. while rotating the core member. After cooling, the solidified coating resin was removed from the mold as the tubular object.

By the above operations, a tubular object of the specified length could be obtained with almost no resin loss since only approximately 2 mm was cut off the opposite ends in order to provide the end faces. The thickness deviation of the obtained tubular object was ±1.0 $\mu$m, which is a small deviation. The shape of the outer face of the tubular object was measured by a roughness meter, and no waviness or unevenness was found at all. Furthermore, the external appearance was also excellent, with no striped patterns.

EXAMPLE 2

In the application of the liquid heat-resistant resin from the dispenser, the tubular object was obtained by the same materials and methods as Example 1, except for the conditions shown in Table 1.

The obtained tubular object was of a predetermined length, and with almost no resin loss since only approximately 2 mm was cut off from the opposite ends in order to provide the end faces. A light striped pattern was noted in the obtained tubular object, but the thickness deviation of the tubular object was ±1.5 µm, which is a small deviation. The shape of the outer face of the tubular object was measured by a roughness meter, and no waviness or unevenness was found at all.

EXAMPLE 3

In the application of the liquid heat-resistant resin from the dispenser, the tubular object was obtained by the same materials and methods as Example 1, except for the conditions shown in Table 1.

The obtained tubular object was of a predetermined length, and with almost no resin loss since only approximately 2 mm was cut off from the opposite ends in order to provide the end faces. The thickness deviation of the tubular object was ±1.5 µm, which is a small deviation. The shape of the outer face of the tubular object was measured by a roughness meter, and no waviness or unevenness was found at all. Furthermore, the external appearance was also excellent, with no striped patterns.

EXAMPLE 4

In the application of the liquid heat-resistant resin from the dispenser, the tubular object was obtained by the same materials and methods as Example 1, except for the conditions shown in Table 1.

The obtained tubular object was of a predetermined length, and with almost no resin loss since only approximately 2 mm was cut off from the opposite ends in order to provide the end faces. The thickness deviation of the tubular object was ±1.5 µm, which is a small deviation. The shape of the outer face of the tubular object was measured by a roughness meter, and no waviness or unevenness was found at all. Furthermore, the external appearance was also excellent, with no striped patterns.

EXAMPLE 5

In the application of the liquid heat-resistant resin from the dispenser, the tubular object was obtained by the same materials and methods as Example 1, except for the conditions shown in Table 1.

The obtained tubular object was of a predetermined length, and with almost no resin loss since only approximately 2 mm was cut off from the opposite ends in order to provide the end faces. The thickness deviation of the tubular object was ±3.0 µm. The shape of the outer face of the tubular object was measured by a roughness meter, and no waviness or unevenness was found at all. Furthermore, the external appearance was also excellent, with no striped patterns.

EXAMPLE 6

With respect to the application of the liquid heat-resistant resin from the dispenser, the tubular object was obtained by the same materials and methods as Example 1, except that the resin discharge amount was set to 0.161 cc/sec at the opposite ends and to 0.129 cc/sec in the middle portion, and adjustment was conducted so that the resin discharge amount continuously changed therebetween.

The obtained tubular object had a predetermined length, and with almost no resin loss since only approximately 2 mm were cut off from the opposite ends in order to provide the end faces. The obtained tubular object was 50 µm thick at the opposite ends and 40 µm thick in the middle portion, and the thickness continuously changed therebetween, resulting in a crown-shaped object. Thickness deviation in the circumferential direction was ±1.0 µm at any position in the axial direction, which is a small thickness deviation. Upon measuring the shape of the external face of the tubular object by a roughness meter, no waviness or unevenness was found at all. Moreover, the external appearance was also excellent, with no striped patterns.

EXAMPLE 7

A tubular object was molded by the same method as Example 1, except that, as the inorganic filler, 12 parts potassium titanate whisker (Tismo-D manufactured by Otsuka Chemical Co., Ltd.) was added instead of the 10 parts alumina powder manufactured by Showa Denko K.K.

The circumferential strength of the obtained tubular object was 25 kg/mm$^2$ and the axial strength was 18 kg/mm$^2$; thus, circumferential strength was excellent.

COMPARATIVE EXAMPLE 1

Using the same resin and mold as Example 1, resin was applied to the mold surface by the dipping method. Next, the excess resin was shaved off by dropping a die from the top of the mold to thereby obtain a predetermined coating thickness. Furthermore, 1 cm of resin was eliminated from the lower end in order to facilitate mold release. Finally, the tubular object was obtained by conducting heating and mold release under the same conditions as Example 1.

A 3 cm portion was cut off from the upper end, because the upper end part of the tube was slanted and the thickness deviation was large. Accordingly, the combined resin loss from the upper end lower ends was 4 cm. The shape of the external face of the tubular object was measured by a roughness meter, and no waviness or unevenness was found. There was also no striped pattern. The thickness deviation was ±4 µm, which is a large deviation.

COMPARATIVE EXAMPLE 2

With respect to the application of the liquid heat-resistant resin from the dispenser, the manufacture of the tubular object was attempted by the same materials and methods as Example 1, except for the conditions shown in Table 1.

The thickness deviation of the obtained tubular object was ±12 µm, which is a very large deviation. Furthermore, a striped pattern was noted, and the external appearance was not good.

TABLE 1

|  |  | Example 1 | Example 2 | Example 3 | Example 4 | Example 5 | Comp Ex 2 |
|---|---|---|---|---|---|---|---|
| Application Conditions | Resin Viscosity (ps) | 1500 | 1500 | 1500 | 1500 | 12000 | 17000 |
|  | V/R (mm/rotation) | 1.17 | 2.20 | 1.17 | 1.60 | 1.17 | 2.20 |
|  | Nozzle Inner Diameter (mm) | 2 | 2 | 2 | 2 | 2 | 2 |
|  | Outer Diameter (mm) | 4 | 4 | 2.5 | 4 | 4 | 2.5 |
|  | Shape | tube | tube | tube | tube | tube | tube |
| Evaluation | Thickness Deviation (μm) | ±1.0 | ±1.5 | ±1.5 | ±1.5 | ±3.0 | ±12.0 |
|  | Striped Pattern | no | yes | no | no | no | yes |
| Overall Evaluation |  | A | C | B | B | C | D |

(Notes)
(1) The presence or absence of striped pattern was evaluated by visual observation of the external appearance of the tubular object.
(2) The overall evaluation was a comprehensive evaluation of the thickness deviation of the tubular object, the presence or absence of striped pattern, and the resin loss. Evaluation was conducted in 4 categories. A: extremely good, B: good, C: good, but a striped pattern or thickness deviations were somewhat observed, D: no good.

By using a tubular object manufacturing method to apply a liquid heat-resistant resin which is continuously fed from a dispenser onto the outer or inner surface of a rotating core member while moving the feeder part in the direction of the rotation axis, the present invention can markedly improve the thickness precision of the tubular object, and reduce resin loss, and also permits a desired thickness distribution in the axial direction of the tubular object according to necessity. Furthermore, by using a liquid heat-resistant resin containing needle-shaped or scaly inorganic filler, tubular objects which have circumferential strength larger than axial strength can be manufactured.

What is claimed is:

1. A tubular object manufacturing method comprising the steps of:

setting a viscosity of a liquid heat-resistant resin between 10 and 15000 poise at 25° C., wherein said liquid heat-resistant resin is polyimide varnish and contains an inorganic filler;

applying said liquid heat-resistant resin onto one of an outer surface and an inner surface of a tubular member which is a shaping mold by a liquid discharge nozzle of a dispenser to form a uniform coating layer thereon, said applying step including the steps of:

rotating said tubular member, continuously feeding liquid heat-resistant resin by means of said liquid discharge nozzle of said dispenser onto the respective one of said outer surface and said inner surface of said tubular member, wherein said liquid discharge nozzle of said dispenser is tubular and has a wall thickness t within a range expressed by a first relational expression of 0.3 mm<t<3.0 mm such that a predetermined stirring effect is achieved and a striped pattern and unevenness due to a lack of uniformity in dispersion of said inorganic filler is prevented while reducing the time needed to apply said liquid heat-resistant resin to form said uniform coating layer, moving a central part of a liquid discharge nozzle of said dispenser in a direction of a rotational axis of said tubular member, said liquid discharge nozzle of said dispenser being slanted with respect to said tubular member and contacting the respective one of said outer surface and said inner surface of said tubular member and the continuously fed liquid heat-resistant resin, wherein a ratio of a moving speed V of said liquid discharge nozzle of said dispenser in the direction of the rotational axis of said tubular member to a rotational speed R of said tubular member is within a range expressed by a second relational expression of (V/R)<1.5 mm/rotation such that said resin is applied evenly and without a striped pattern, and forming said uniform coating layer by helically winding the continuously fed liquid heat-resistant resin onto said respective one of said outer surface and said inner surface of said tubular member;

at least one of solidifying and hardening the applied liquid heat-resistant resin of said uniform coating layer until said uniform coating layer becomes strong enough to maintain at least a structure of said tubular object; and removing said tubular object from said tubular member.

2. A tubular object manufacturing method according to claim 1, wherein at least one of the amount of the liquid heat-resistant/resin fed from said liquid discharge nozzle of said dispenser and a moving speed of said liquid discharge nozzle of said dispenser are changed desirably while said liquid discharge nozzle of said dispenser moves in the direction of the rotational axis of said tubular member to make the tubular object have a desired thickness distribution in an axial direction.

* * * * *